Patented Jan. 1, 1952

2,580,402

UNITED STATES PATENT OFFICE 2,580,402

DERIVATIVES OF HYDROXYCYCLOALKYL-ALKYLBENZOYLALIPHATIC ACIDS AND METHODS FOR PRODUCING SAME

Robert R. Burtner, Skokie, Ill., assignor to G. D. Searle & Co., Chicago, Ill., a corporation of Illinois No Drawing. Application March 18, 1950, Serial No. 150,549

23 Claims. (Cl. 260—520)

This invention relates in general to cycloalkylalkylbenzoylaliphatic acids containing hydroxyl and alkoxyl substituents in the phenyl nucleus, and to methods for the production of such compounds. More particularly, this invention is concerned with compounds of the general structural formula

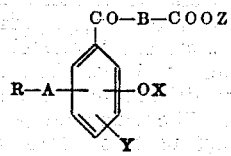

wherein R is a cycloalkyl radical, X is a hydrogen or lower alkyl radical, Y is a hydrogen, alkyl, hydroxyl or alkoxyl radical, A and B are lower alkylene groups and Z is hydrogen or one equivalent of a cation.

In the foregoing structural formula, R represents alicyclic radicals such as cyclobutyl, cyclopentyl, cyclohexyl, cycloheptyl, as well as alkyl derivatives of such radicals. X represents hydrogen or a lower alkyl radical such as methyl, ethyl, propyl, isopropyl, butyl, isobutyl, secondary-butyl, tertiary-butyl and the like. Y represent a member of the class consisting of hydrogen, hydroxyl, lower alkyl groups of the foregoing type, and lower alkoxyl radicals such as methoxy, ethoxy, propoxy, isopropoxy, butoxy, isobutoxy, secondary-butoxy, tertiary-butoxy and the like. The alkylene group represented by A consists of a bivalent aliphatic hydrocarbon radical containing one to eight carbon atoms in a straight or branched chain arrangement such as methylene, ethylene, propylene, butylene, pentylene, hexylene, heptylene, octylene and polymethylene from trimethylene to octamethylene.

The radical B may likewise represent unsaturated aliphatic hydrocarbon radicals containing one or two double bonds, such as vinylene and allylene. The alkylene group B is a member of the same class of bivalent aliphatic hydrocarbon radicals, excluding only methylene. Z represents one equivalent of a cation such as hydrogen, an alkali metal ion, an earth alkali metal ion, an ammonium ion and an amine ion.

The object of this invention is to provide novel chemical substances of the type indicated above and to provide simple and economical methods of producing such substances. Further, it is the object of the invention to provide feasible synthetic methods for the manufacture of the foregoing substances from readily available starting materials.

The compounds of the invention are useful as therapeutic agents and as intermediates in chemical synthesis. Thus, certain of them are effective as choleretic agents. For this purpose, they may be administered in the form of the free acids or in the form of water soluble salts. Further, certain of these compounds are useful as parasiticidal agents.

The compounds of this invention are prepared by reacting an alkoxyphenylalkylcycloalkane of the following general formula

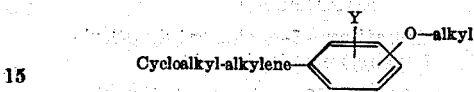

with a dibasic aliphatic acid anhydride or halide derived from a dibasic acid of the following formula

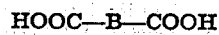

with a Friedel-Crafts type catalyst, generally in an inert organic solvent. Among such catalysts are anhydrous aluminum chloride, anhydrous ferric chloride, stannic chloride, boron trifluoride, zinc chloride, hydrogen fluoride, sodium-aluminum chloride and similar substances. The inert solvents are organic liquids having chemical reactivities lower than those of the foregoing ethers and include nitrobenzene, carbon disulfide, chlorobenzene, tetrachloroethane, and related substances. Among the dibasic acid anhydrides and halides which can be used in preparing these compounds are succinic, glutaric, adipic, pimelic, suberic, sebacic, maleic, fumaric, methylsuccinic, ethylsuccinic, alpha-methylglutaric, beta-methylglutaric, alpha-methyladipic and related dibasic acids. The mono-ester acid chlorides of these acids may likewise be employed. The alkoxyphenylalkylcycloalkanes are conveniently obtained by the alkylation of the corresponding hydroxyphenylalkylcycloalkanes which are prepared by the process of R. H. Talbot and R. Adams, J. Am. Chem. Soc. 49, 2040; 1927.

The alkoxyl compounds obtained in the Friedel-Crafts reaction may be dealkylated by the usual methods such as by the use of aluminum chloride or such hydrohalic acids as hydrobromic or hydriodic acid.

Salts of the acids which comprise this invention are generally prepared by reacting the acids with an aqueous solution of alkali or of an organic amine such as a lower alkyl, dialkyl, or trialkyl amine or corresponding alkanol amine, filtering the solution so formed and evaporating the filtrate to dryness, generally under low pressure and at low temperature. In certain instances the salts of the acids of this invention may be obtained in crystalline form by salting out said salts with a simple inorganic salt such as sodium chloride, sodium sulfate or ammonium chloride. Alternatively salts of the acids of this invention can be prepared by reacting an alcoholic solution of the acid with an alcoholic solution of an alkali or an amine. The salts are often insoluble in the alcohol and may be isolated as precipitates. In other instances the salts may be thrown down by the addition of a second solvent in which the salts are insoluble. Among such solvents are ether, benzene, chloroform and carbon tetrachloride.

My invention will be described more fully in conjunction with the following examples. It should be understood, however, that these examples are given by way of illustration only and that the invention is not to be construed as limited in spirit or in scope by the details set forth therein. It will be apparent to those skilled in the art that many modifications in materials and methods may be made without departing from the invention. In each of these examples, temperatures are given in degrees centigrade, relative amounts of materials are given in parts by weight and pressure during vacuum distillation are measured in millimeters (mm.) of mercury.

EXAMPLE 1

Beta-(2,4-dimethoxy-5-cyclopentylmethylbenzoyl) propionic acid

To a suspension of 350 parts of 2,4-dimethoxybenzylcyclopentane and 160 parts of succinic anhydride in 1920 parts of nitrobenzene 437 parts of anhydrous aluminum chloride are added portionwise with good agitation. During the addition and for an additional 15 minutes the temperature is maintained at 0° to 5°, efficient agitation being used throughout. Stirring at room temperature is continued for three hours. Hydrolysis is effected by quenching with dilute hydrochloric acid and ice. The mixture is steam distilled to remove solvent and the aqueous residue chilled. The semi-solid crude product is taken up in 2000 parts of water containing 30 parts of sodium carbonate at about 90°. The hot solution is cooled, washed once with ether and then heated to remove all ether residues. After cooling the solution is acidified, the sand colored acid is filtered, rinsed with water and dried. 265 parts of the crude beta-(2,4-dimethoxy-5-cyclopentylmethylbenzoyl) propionic acid of the structure

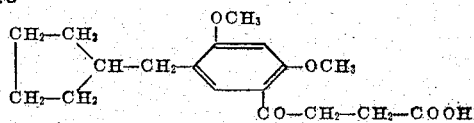

are obtained. Two recrystallizations from five volumes of methanol, using charcoal as a clarifying agent, give pure, colorless crystals melting at about 159–160°.

EXAMPLE 2

Beta-(2,4-dihydroxy-5-cyclopentylmethylbenzoyl) propionic acid

A mixture of 65 parts of beta-(2,4-dimethoxy-5-cyclopentylbenzoyl) propionic acid, 975 parts of 47% hydriodic acid and 270 parts of acetic anhydride is refluxed for 30 minutes. The solution is then poured into ice water and the precipitate is collected on a filter, rinsed with water and dried. 60 parts of crude beta-(2,4-dihydroxy-5-cyclopentylmethylbenzoyl) propionic acid are thus obtained which, after crystallization from 470 parts of glacial acetic acid using charcoal as a clarifying agent, yield 42 parts of pure, colorless crystals melting at about 201°. In the ferric chloride test, a strong purple color is obtained.

EXAMPLE 3

Beta-(2-methoxy-5-cyclohexylethylbenzoyl)-propionic acid

Cyclohexylacetyl chloride is condensed with anisole in nitrobenzene using aluminum chloride as a catalyst in order to prepare p-cyclohexylacetylanisole, which boils at 135–136° at 0.3 mm. pressure. Clemmensen reduction in a mixture of hydrochloric acid and toluene yields p-cyclohexylethylanisole of a boiling point of 128–130° at 0.8 mm. pressure.

300 parts of p-cyclohexylethylanisole and 140 parts of succinic anhydride suspended in 1800 parts of nitrobenzene are reacted with good agitation at 0 to 5° with 375 parts of anhydrous aluminum chloride which is added portionwise. After completion of the addition, stirring at 0° is continued for one hour. The mixture is then permitted to warm up to room temperature and, after 15 hours' standing, is quenched with dilute hydrochloric acid and ice. The solvent is removed by steam distillation and the aqueous residue is chilled. The dark, tacky crude acid is taken up in 1000 parts of water containing 30 parts of sodium carbonate at about 90°. The hot solution is filtered, cooled, washed once with ether and the residual ether removed by heating. The solution is then chilled, and upon acidification a light brown oil separates which becomes granular on standing. The precipitate of the beta-(2-methoxy-5-cyclohexylethylbenzoyl)-propionic acid is collected on a filter, rinsed with water, dried, and then recrystallized from cyclohexane. The colorless crystals melt at about 103°.

EXAMPLE 4

Beta-(2-hydroxy-5-cyclohexylethylbenzoyl)-propionic acid

Demethylation of beta-(2-methoxy-5-cyclohexylethylbenzoyl) propionic acid is carried out by the method described in Example 2. The crude acid is crystallized from 70% acetic acid using charcoal as a clarifying agent and pure colorless crystals melting at 105–105.5° are obtained. In the ferric chloride test an amethyst color is obtained. The acid has the formula

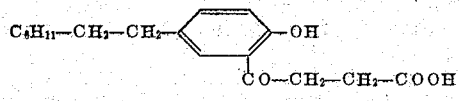

EXAMPLE 5

Beta-(3,4-dimethoxy-5-cyclohexylmethylbenzoyl) propionic acid

Cyclohexyl magnesium bromide is reacted with 2,3-dimethoxybenzaldehyde to produce 2,3-dimethoxyphenyl cyclohexyl carbinol. The latter is oxidized to the 2,3-dimethoxyphenyl cyclohexyl ketone which on Clemmensen reduction yields 2,3-dimethoxybenzylcyclohexane, which boils at 135–136° at 0.3 mm. pressure.

536 parts of anhydrous aluminum chloride are added portionwise at 0 to 5° to a stirred suspension of 470 parts of 2,3-dimethoxybenzylcyclohexane and 200 parts of succinic anhydride in 2400 parts of nitrobenzene. After completion of the addition, stirring is continued for 20 minutes at 0° and then at room temperature for 4 hours. The product is worked up as in Example 3. Upon acidification a dark yellow, viscous oil is obtained which granulates readily on standing. The crude acid is triturated with water, collected on a filter, rinsed with water and dried. Crystallization from 70% acetic acid using charcoal as a clarifying agent and then from methanol yields pure, colorless beta-(3,4-dimethoxy-5-cyclohexylmethylbenzoyl)propionic acid, which melts at about 144°.

EXAMPLE 6

*Beta-(3,4-dihydroxy-5-cyclohexylmethylbenzoyl)propionic acid*

100 parts of beta-(3,4-dimethoxy-5-cyclohexylmethylbenzoyl)propionic acid are demethylated by the method described in Example 2, using 1650 parts of 47% hydriodic acid and 490 parts of acetic anhydride. Two recrystallizations of the crude acid from 70% acetic acid yield colorless needles which melt at 152–153°.

EXAMPLE 7

*Beta-(2,4-dimethoxy-5-cyclohexylmethylbenzoyl)propionic acid*

665 parts of 2,4-dimethoxybenzylcyclohexane (obtained by methylation of cyclohexylresorcinol) and 290 parts of succinic anhydride suspended in 3600 parts of nitrobenzene are reacted at 0 to 3° under efficient agitation with 777 parts of aluminum chloride which is added portionwise. After completion of the addition, stirring is continued for 20 minutes at 0° and then at room temperature for 4 hours. The crude acid is obtained by the method described in Example 5. Crystallization from acetic acid yields pure, colorless needles, melting at about 174°.

EXAMPLE 8

*Beta-(2,4-dihydroxy-5-cyclohexylmethylbenzoyl)propionic acid*

Demethylation of the beta-(2,4-dimethoxy-5-cyclohexylmethylbenzoyl)propionic acid, obtained as in Example 7, with hydriodic acid and acetic anhydride gives the dihydroxy-acid, which melts at 212° with decomposition. The ferric chloride test gives a strong purple color.

EXAMPLE 9

*Beta-(2,5-dimethoxy-4-cyclohexylmethylbenzoyl)propionic acid*

By a reaction of hydroquinone dimethyl ether and hexahydrobenzoyl chloride with aluminum chloride in nitrobenzene the 2,5-dimethoxyphenyl cyclohexyl ketone is obtained which boils at 142–144° at 0.1 mm. Clemmensen reduction yields 2,5-dimethoxybenzylcyclohexane, boiling at 115–116° at 0.25 mm. pressure. 340 parts of this 2,5-dimethoxybenzylcyclohexane and 150 parts of succinic anhydride suspended in 1800 parts of nitrobenzene are reacted at 0 to 3° under efficient agitation with 402 parts of anhydrous aluminum chloride which is added portionwise. When the addition is complete, stirring is continued for 30 minutes at 0° and then at 20 to 25° for 5½ hours. The product is worked up in the usual manner. The crude beta-(2,5-dimethoxy-4-cyclohexylmethylbenzoyl)propionic acid is purified by crystallization from methanol using charcoal as a clarifying agent. The colorless crystals melt at about 124°.

EXAMPLE 10

*Beta-(2,5-dihydroxy-4-cyclohexylmethylbenzoyl)propionic acid*

The acid described in Example 9 is demethylated by the method of Example 2. Crystallization from 70% acetic acid yields buff colored crystals which have no definite melting point but decompose at about 170° in a preheated bath With ferric chloride a dark green color is obtained.

EXAMPLE 11

*Beta-(4,5-dimethoxy-2-cyclohexylmethylbenzoyl)propionic acid*

Interaction of hexahydrobenzoyl chloride and veratrole in the presence of aluminum chloride in nitrobenzene gives 3,4-dimethoxybenzoylcyclohexane (boiling at 160–162°/0.3 mm.), which on Clemmensen reduction yields 3,4-dimethoxybenzylcyclohexane (boiling at 121–122°/0.25 mm.). 570 parts of this 3,4-dimethoxybenzylcyclohexane and 250 parts of succinic anhydride suspended in 3000 parts of nitrobenzene are reacted at 0 to 3° under efficient agitation with 670 parts of anhydrous aluminum chloride which is added portionwise. After completion of the addition, stirring is continued for 30 minutes at 0° and for 4 hours at 20 to 25°. Hydrolysis, steam distillation of the solvent and extraction with hot alkali as described in Examples 1 and 3 gives beta-(4,5-dimethoxy - 2 - cyclohexylmethylbenzoyl)propionic acid. Crystallization from methanol with the aid of charcoal as a clarifying agent yields pale yellow needles, melting at about 148°.

EXAMPLE 12

*Beta-(4,5-dihydroxy-2-cyclohexylmethylbenzoyl)propionic acid*

The acid described in Example 11 is demethylated by the procedure of Example 2. Recrystallization from 60% acetic acid produces crystals melting at 131–132°. A dark green color is obtained in the ferric chloride test.

EXAMPLE 13

*Beta-[2,4-dimethoxy-5-(beta-cyclohexylethyl)-benzoyl]propionic acid*

570 parts of 2,4-dimethoxyphenethylcyclohexane (obtained by methylation of beta-cyclohexylethylresorcinol) and 240 parts of succinic anhydride suspended in 2760 parts of nitrobenzene are reacted at 0 to 5° under efficient agitation with 643 parts of aluminum chloride which is added portionwise. After completion of the addition, stirring is continued for 20 minutes at 0° and then at room temperature for 4 hours. The crude acid is obtained by the method described in Example 3. Crystallization from acetic acid using charcoal as a clarifier yields pure beta-(2,4-dimethoxy - 5 - cyclohexylethylbenzoyl)propionic acid which melts at about 165°. This compound has the structural formula

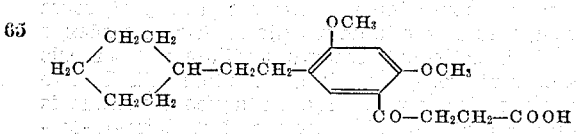

EXAMPLE 14

*Beta-[2,4-dihydroxy-5-(beta-cyclohexylethyl)-benzoyl]propionic acid*

Demethylation of the acid described in Example 13 is carried out by the procedure given in Example 2. The crude acid is recrystallized from methanol and pure, colorless crystals are obtained which melt at about 146°. A deep red color is observed in the ferric chloride test.

EXAMPLE 15

*Beta-[2,4-dimethoxy-5-(omega-cyclohexyl-amyl)benzoyl]propionic acid*

Delta-cyclohexylvaleric acid reacts with resorcinol under the influence of zinc chloride to produce the delta-cyclohexylbutyl 2,4-dihydroxyphenyl ketone which, reduced with zinc and hydrochloric acid, yields omega-(2,4-dihydroxyphenyl)pentylcyclohexane melting at about 89°. The latter is dimethylated with dimethyl sulfate. 1000 parts of the 1-(omega-cyclohexylpentyl)-2,-4-dimethoxybenzene thus obtained ($n_D^{25}=1.5142$) and 350 parts of succinic anhydride are suspended in 4200 parts of nitrobenzene and are reacted at 0 to 5° under efficient agitation with 938 parts of aluminum chloride. After completion of the addition, stirring is continued for 20 minutes at 0° and then for 4 hours at 15°. The crude acid, obtained by the method described in Example 3, is sand colored. Crystallization from methanol with the use of charcoal as a clarifying aid yields the pure acid of the formula

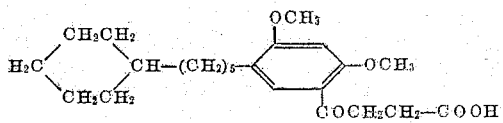

The crystals melt at 150.5°.

EXAMPLE 16

*Beta-[2,4-dihydroxy-5-(omega-cyclohexylamyl)-benzoyl]propionic acid*

The acid described in Example 15 is demethylated by the procedure given in Example 2. The crude product is waxy, but on crystallization from methanol with the use of charcoal the crystalline beta-2,4-dihydroxy-5-(omega-cyclohexylamyl)benzoyl propionic acid is obtained in pure form. The acid melts at about 145° and gives a deep amethyst color with ferric chloride.

EXAMPLE 17

*Delta-(2-isopropyl - 4 - methoxy - 5 - hexahydrobenzyl-benzoyl)valeric acid*

49 parts of 2-hexahydrobenzyl-5-isopropylanisole and 26 parts of adipic anhydride are suspended in a mixture of 100 parts of nitrobenzene and 400 parts of tetrachloroethane. To this suspension, maintained in a state of strong agitation throughout the reaction, 56 parts of aluminum chloride are added portionwise. The temperature is kept at 0 to 5° during the addition and for two hours longer. After standing at room temperature for 12 hours, the addition complex is hydrolyzed by quenching with dilute hydrochloric acid and ice. The mixture is steam distilled to remove the solvent and the aqueous residue is chilled and filtered. The resulting delta-(2-isopropyl-4-methoxy- 5 -hexahydrobenzylbenzoyl)-valeric acid is purified by the method described in Example 3. Recrystallization from a mixture of benzene and petroleum ether results in the formation of colorless needles which are moderately soluble in dilute alkali.

I claim:

1. A compound of the structural formula

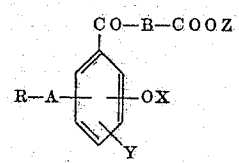

wherein R is a cycloalkyl radical of no more than six carbon atoms, X is a member of the class consisting of hydrogen and lower alkyl radicals, Y is a member of the class consisting of hydrogen, lower alkyl, hydroxyl and lower alkoxyl, A and B are bivalent aliphatic hydrocarbon radicals of no more than six carbon atoms and Z is a member of the class consisting of hydrogen and one equivalent of a cation.

2. The process of producing a beta-cyclohexylmethyldimethoxybenzoylpropionic acid of the structural formula

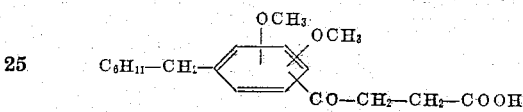

which comprises reacting a hexahydrobenzyldimethoxybenzene with succinic anhydride in the presence of anhydrous aluminum chloride and separating the acid formed.

3. The process of producing a beta-cyclohexylmethyldihydroxybenzoylpropionic acid of the structural formula

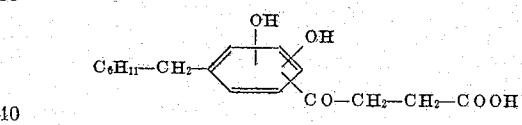

which comprises reacting dimethoxybenzylcyclohexane with succinic acid in the presence of anhydrous aluminum chloride, separating the acid formed, demethylating said acid with a hydrohalic acid and separating the demethylated acid thus formed.

4. A compound of the structural formula

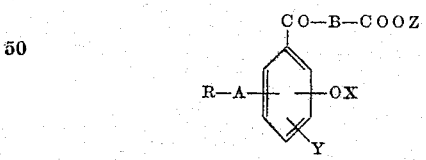

wherein R is a cycloalkyl radical of no more than six carbon atoms, X is a lower alkyl radical, Y is a lower alkoxyl radical, A and B are bivalent aliphatic hydrocarbon radicals of no more than six carbon atoms and Z is one equivalent of a cation.

5. A compound of the structural formula

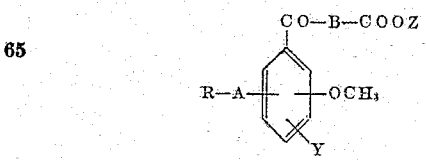

wherein R is a cycloalkyl radical of no more than six carbon atoms, Y is a lower alkoxyl radical, A and B are bivalent aliphatic hydrocarbon radicals of no more than six carbon atoms and Z is one equivalent of a cation.

6. A compound of the structural formula

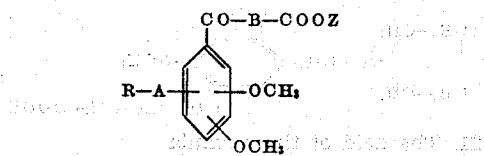

wherein R is a cycloalkyl radical of no more than six carbon atoms, A and B are bivalent aliphatic hydrocarbon radicals of no more than six carbon atoms and Z is one equivalent of a cation.

7. A compound of the structural formula

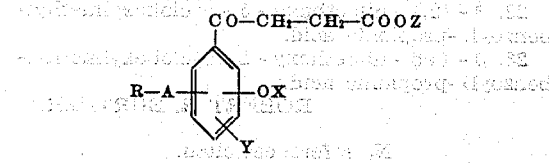

wherein R is a cycloalkyl radical of no more than six carbon atoms, X is a lower alkyl radical, Y is a lower alkoxyl radical, A is a bivalent aliphatic hydrocarbon radical of no more than six carbon atoms and Z is one equivalent of a cation.

8. A compound of the structural formula

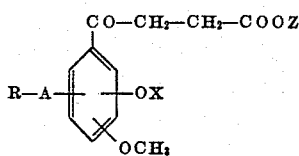

wherein R is a cycloalkyl radical of no more than six carbon atoms, X is a lower alkyl radical, A is a bivalent aliphatic hydrocarbon radical of no more than six carbon atoms and Z is one equivalent of a cation.

9. A compound of the structural formula

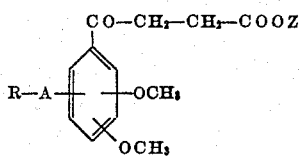

wherein R is a cycloalkyl radical of no more than six carbon atoms, A is a bivalent aliphatic hydrocarbon radical of no more than six carbon atoms and Z is one equivalent of a cation.

10. A compound of the structural formula

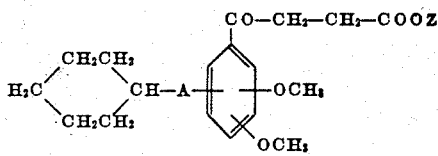

wherein A is a bivalent aliphatic hydrocarbon radical of no more than six carbon atoms and Z is one equivalent of a cation.

11. A compound of the structural formula

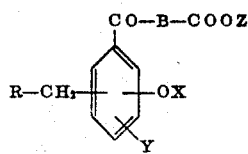

wherein R is a cycloalkyl radical of no more than six carbon atoms, X is a lower alkyl radical, Y is a lower alkoxyl radical, B is a bivalent aliphatic hydrocarbon radical of no more than six carbon atoms and Z is one equivalent of a cation.

12. A compound of the structural formula

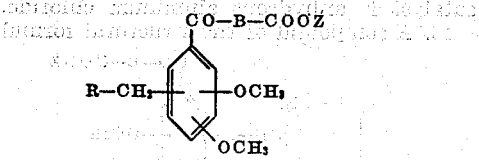

wherein R is a cycloalkyl radical of no more than six carbon atoms, B is a bivalent aliphatic hydrocarbon radical of no more than six carbon atoms and Z is one equivalent of a cation.

13. A compound of the structural formula

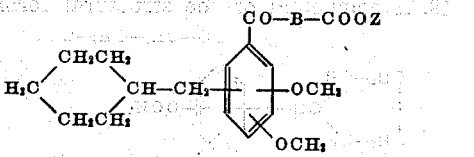

wherein B is a bivalent aliphatic hydrocarbon radical of no more than six carbon atoms and Z is one equivalent of a cation.

14. A compound of the structural formula

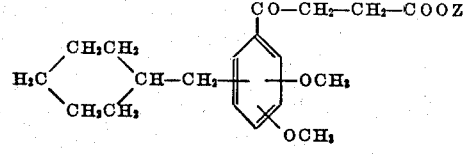

wherein Z is one equivalent of a cation.

15. A compound of the structural formula

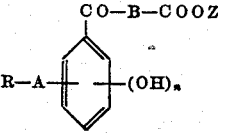

wherein R is a cycloalkyl radical of no more than six carbon atoms, A and B are bivalent aliphatic hydrocarbon radicals of no more than six carbon atoms, Z is one equivalent of a cation, and $n$ is an integer smaller than 3.

16. The process of producing a compound of the formula

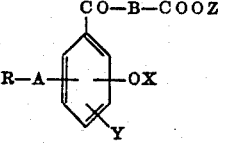

wherein R is a cycloalkyl radical of no more than six carbon atoms, X is a member of the class consisting of hydrogen and lower alkyl radicals, Y is a member of the class consisting of hydrogen, lower alkyl, hydroxyl and lower alkoxyl, A and B are bivalent aliphatic hydrocarbon radicals of no more than six carbon atoms and Z is a member of the class consisting of hydrogen and one equivalent of a cation, which comprises reacting an alkoxyphenyl-alkylcycloalkane of the formula

wherein R, A, X and Y have the foregoing meanings, with a member of the class consisting of acid anhydrides and acid halides derived from a dibasic aliphatic acid of the formula

HOOC—B—COOH in the presence of a Friedel-Crafts catalyst in an inert solvent and separating the acid formed.

17. The process of claim 16, wherein the catalyst is anhydrous aluminum chloride.

18. A compound of the structural formula

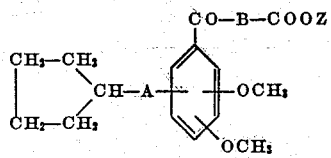

wherein A and B are bivalent aliphatic hydrocarbon radicals of no more than six carbon atoms and Z is one equivalent of a cation.

19. A compound of the structural formula

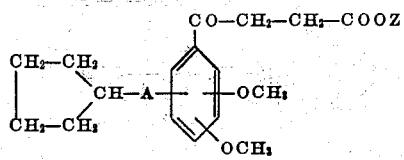

wherein A is a bivalent aliphatic hydrocarbon radical of no more than six carbon atoms and Z is one equivalent of a cation.

20. The acid of the formula

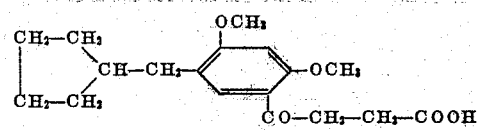

21. The acid of the formula

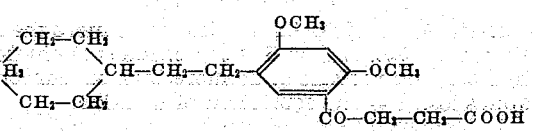

22. β - (2,4 - dimethoxy - 5 - cyclohexylmethylbenzoyl) -propionic acid.

23. β - (4,5 - dimethoxy - 2 - cyclohexylmethylbenzoyl) -propionic acid.

ROBERT R. BURTNER.

No references cited.